United States Patent
Mashimo

(10) Patent No.: US 7,397,750 B2
(45) Date of Patent: Jul. 8, 2008

(54) OPTICAL DISC APPARATUS WITH RULE BASED SYNCHRONIZATION

(75) Inventor: Akira Mashimo, Tokorozawa (JP)

(73) Assignee: TEAC Corporation, Musashino-shi (JP)

( * ) Notice: Subject to any disclaimer, the term of this patent is extended or adjusted under 35 U.S.C. 154(b) by 581 days.

(21) Appl. No.: 10/982,245

(22) Filed: Nov. 4, 2004

(65) Prior Publication Data
US 2005/0094517 A1    May 5, 2005

(30) Foreign Application Priority Data
Nov. 5, 2003    (JP)    ............... 2003-375923

(51) Int. Cl.
G11B 7/00    (2006.01)
(52) U.S. Cl. ............... 369/53.34; 369/59.11; 369/59.25
(58) Field of Classification Search ............... 369/53.34, 369/59.11, 59.25
See application file for complete search history.

(56) References Cited

U.S. PATENT DOCUMENTS

| | | | |
|---|---|---|---|
| 5,339,303 A | | 8/1994 | Yoshimaru |
| 6,173,430 B1* | | 1/2001 | Massoudi ............... 714/775 |
| 2002/0067668 A1* | | 6/2002 | Ishida et al. ............... 369/47.22 |
| 2003/0053389 A1* | | 3/2003 | Mashimo ............... 369/59.11 |
| 2004/0105367 A1* | | 6/2004 | Masui ............... 369/47.31 |
| 2006/0153041 A1* | | 7/2006 | Miyashita et al. ............... 369/59.22 |

FOREIGN PATENT DOCUMENTS

| | | |
|---|---|---|
| JP | 2-306472 A | 12/1990 |
| JP | 4-212723 A | 8/1992 |
| JP | 10-55627 A | 2/1998 |
| JP | 2003-91819 A | 3/2003 |

OTHER PUBLICATIONS

Notice of Grounds for Rejection dated Jan. 8, 2008, issued in corresponding Japanese Application No. JP-2003-375923, filed Nov. 5, 2003.

* cited by examiner

Primary Examiner—Wayne Young
Assistant Examiner—LaTanya Bibbins
(74) Attorney, Agent, or Firm—Christensen O'Connor Johnson Kindness PLLC

(57) ABSTRACT

An optical disk apparatus for detecting synchronization signals of an optical disk. Marks and spaces are alternately arranged as synchronization signals of the optical disk. An encoding/decoding circuit of the optical disk apparatus utilizes a rule for alternately arranging synchronization signals, thereby verifying a detected synchronization signal. When the polarity of a synchronization signal detected from a preceding synchronization frame is a mark, the next synchronization signal is a space. When the polarity of a detected synchronization signal is a space, the signal is determined to be a correct synchronization signal.

9 Claims, 3 Drawing Sheets

| | |
|---|---|
| SY0 | 1000#0 010000 000000 001001 |
| SY1 | 10100# 010000 000000 001001 |
| SY2 | 10010# 010000 000000 001001 |
| SY3 | 00000# 010000 000000 001001 |

OPTICAL DISC APPARATUS WITH RULE BASED SYNCHRONIZATION

BACKGROUND OF THE INVENTION

1. Field of the Invention

The present invention relates to an optical disk apparatus, and more particularly, to a device for reproducing data from an optical disk on which synchronization information is formed in accordance with a specific rule.

2. Related Art

The optical disk apparatus hitherto optimizes recording power by means of techniques called OPC (Optimum Power Control) and ROPC (Running Optimum Power Control), thereby recording data. According to the OPC technique, test data are recorded in a predetermined area (PCA) of the optical disk while variously changing the recording power before recording data, and the test data are reproduced. Recording power at which the quality (e.g., a β value) of the reproduced signal becomes optimum is selected and taken as optimum recording power. In the mean time, according to the ROPC technique, consideration is given to the fact that the sensitivity of a recording film of the optical disk is not necessarily uniform within the plane. When data are actually recorded at the optimum recording power determined through OPC, the quantity of return light arising at the time of recording of data is monitored. The recording power is controlled by feedback such that the quantity of return light assumes a constant value. In general, the quantity of light of level B is used as the quantity of return light. The level B represents the quantity of return light acquired when a pit is formed upon exposure of the optical disk to recording power (i.e., the quantity of return light resulting from the recording power having been diffracted by the pit). Specifically, when the quantity of return light of level B is lower than a given value, pits are determined to be formed excessively. Hence, the recording power is reduced. In contrast, when the quantity of return light of level B is higher than the given value, pits are determined not to be formed sufficiently, and the recording power is increased.

Here, data having pit lengths 3T to 11T are recorded on a CD-R/RW or the like. However, difficulty is encountered in monitoring the quantity of return light arising at the time of recording of data having a short pit length to control the recording power through feedback. In light of this difficulty, the quantity of return light arising at the time of recording of data having the longest pit length 11T is detected, thereby effecting ROPC. The CD-R/RW complies with specifications of 11T being included in the synchronization information (SYNC) and of 11T continuously appearing twice at all times on a per-frame basis. Any of the two 11T pit lengths inevitably turns into a mark (i.e., an area where a pit is formed by radiation of the recording power). Therefore, ROPC is carried out cyclically (at the timing of synchronization information to be cyclically inserted) through use of the 11T pit length, thereby making an attempt to cyclically optimize the recording power.

In the case of a DVD-R/RW or the like, 3T to 11T pit lengths are formed as in the case of the CD-R or the like. However, a 14T pit length is used for synchronization information. In contrast with the CD-R, the DVD-R/RW complies with specifications of the 14T pit length being not continuously inserted twice (i.e., a mark and a space are not inserted as a pair) but being inserted only once in one frame (93 bytes). Taking the pit length 14T as a mark or a space is arbitrary. For example, when all of the pit lengths 14T are set as a space, pits are not formed to the longest pit length 14T, and hence ROPC cannot be conducted. Consequently, the recording power cannot be cyclically optimized, which in turn poses a problem of difficulty in maintaining recording quality. As a matter of course, ROPC can also be considered to be enabled by means of setting all of the 14T pit lengths as marks. However, when all of the 14T pit lengths are set to marks, a DSV value is increased, which may result in an increase in low-frequency components. Here, the DSV (Digital Sum Value) is a value determined by accumulating all bits in a sequence from the top while one status (e.g., 1) of the bit sequence—which takes two statuses—is taken as +1 and the other status (e.g., 0) of the same is taken as −1. The low-frequency component (a DC component) becomes small if the DSV value is small, as a result of which the recording and reproducing quality is improved.

A technique described in Japanese Patent Laid-Open Publication No. 2003-91819 is for setting marks and spaces as synchronization information such that they are alternately arranged. According to this technique, ROPC, or the like, is carried out in accordance with the synchronization information about the marks, whereby an attempt can be made to optimize the recording power.

As mentioned above, as a result of the marks and the spaces being alternately formed as synchronization information, ROPC or the like can be cyclically carried out, and the DSV value is also suppressed, thereby diminishing the low-frequency components of a reproduced signal. In addition, the synchronization information alternately appears according to a predetermined rule rather than arbitrarily appearing in the form of either marks or spaces as in the conventional technique, so that the feasibility of various reproduction processing can be expected.

SUMMARY OF THE INVENTION

The present invention provides an optical disk apparatus which performs reproduction processing by utilization of a rule of marks and spaces alternately appearing as synchronization information when data are reproduced from an optical disk on which marks and spaces are alternately arranged.

The present invention provides an optical disk apparatus for reproducing data from an optical disk having synchronization information only once every predetermined information unit, the synchronization information items being formed such that polarities are arranged alternately as a mark and a space, the apparatus comprising: means for radiating a laser beam on the optical disk; means for receiving a laser beam reflected from the optical disk and outputting the received laser beam as a reproduced signal; means for extracting the synchronization information from the reproduced signal; and means for verifying the extracted synchronization information through use of a rule for alternately arranging the mark and the space.

An optical disk apparatus for reproducing data only once from an optical disk having synchronization information every predetermined information unit, the synchronization information items being formed such that polarities are arranged alternately as a mark and a space, the apparatus comprising: means for radiating a laser beam on the optical disk; means for receiving a laser beam reflected from the optical disk and outputting the received laser beam as a reproduced signal; means for extracting the synchronization information from the reproduced signal; and means which compares the length of extracted mark synchronization information with the length of extracted space synchronization information, to thus reproduce data by means of changing a reproduction characteristic in accordance with the result of comparison.

In the present invention, synchronization information does not randomly appear as marks and spaces. In light of the rule of a mark, a space, a mark, a space, . . . appearing alternately, the rule is utilized for predicting the polarity of synchronization information which will appear next, verifying the detected synchronization information, and adjusting a reproduction characteristic. Although adjustment of the reproduction characteristic is arbitrary, the magnitude of recording power is determined from the rate of the length of the mark to the length of the space, thereby increasing or decreasing an optical constant or a circuit constant for reproduction or increasing or decreasing the cycle of the reference clock for reproduction.

The invention will be more clearly comprehended by reference to the embodiments provided below. However, the scope of the invention is not limited to those embodiments.

DETAILED DESCRIPTION OF THE PREFERRED EMBODIMENT

In connection with an embodiment of the present invention, an apparatus which records data on an optical disk and reproduces the data will be described hereinbelow by reference to the drawings. A characteristic of the present invention lies in data reproduction processing, and hence the apparatus may be embodied as a reproduction-only apparatus for reproducing data from the optical disk.

Figure 1:
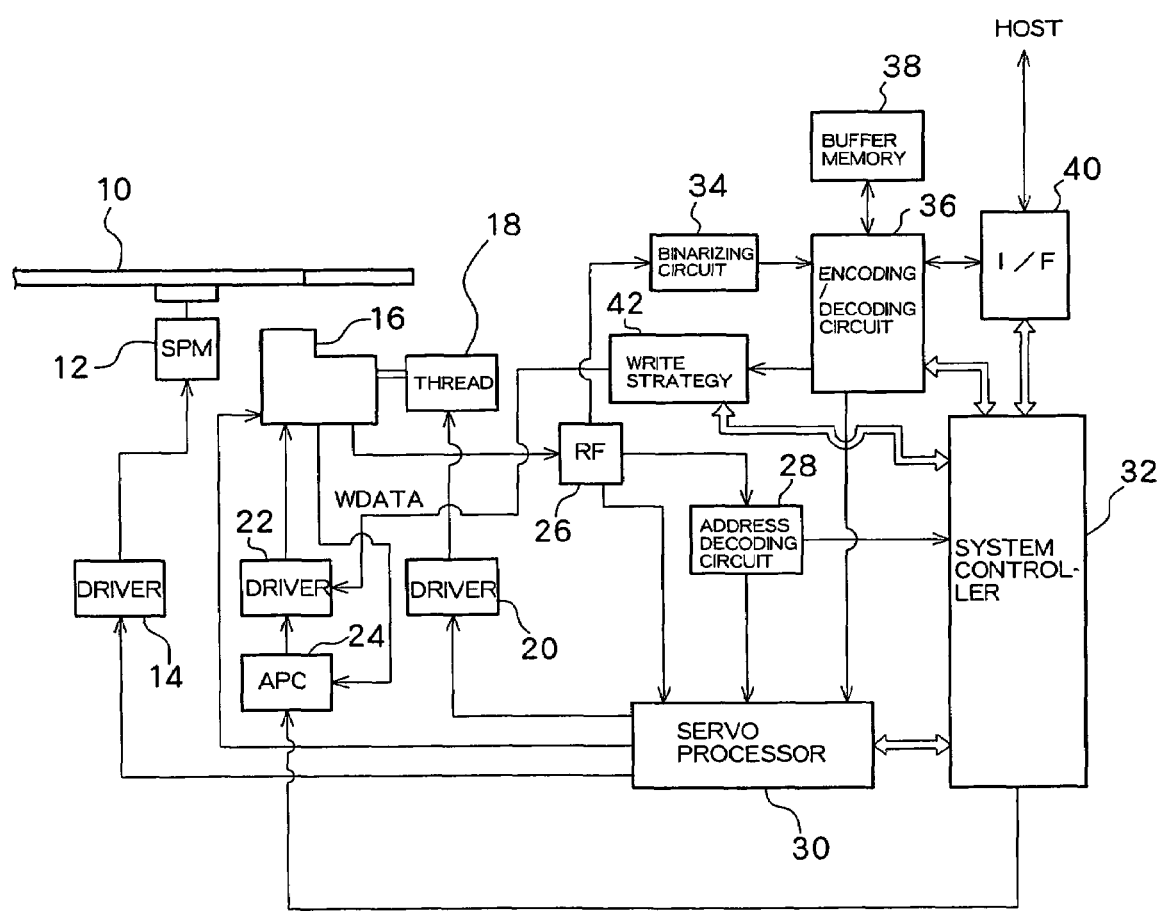
FIG. 1 is an entire block diagram of an optical disk apparatus according to an embodiment.

FIG. 1 shows the entire block diagram of the optical disk apparatus according to the embodiment. An optical disk 10 is rotationally driven by a spindle motor (SPM) 12. The spindle motor SPM 12 is driven by a driver 14, and the driver 14 is servo-controlled by a servo processor 30 so as to attain a desired rotational speed.

An optical pickup 16 includes a laser diode (LD) for radiating a laser beam on the optical disk 10 and a photo detector (PD) which receives the light reflected from the optical disk 10 and converts the light into an electric signal. The optical pickup 16 is disposed opposite the optical disk 10. The optical pickup 16 is driven by a thread motor 18 in a radial direction of the optical disk 10, and the thread motor 18 is driven by a driver 20. Like the driver 14, the driver 20 is servo-controlled by the servo processor 30. The LD of the optical pickup 16 is driven by the driver 22, and the driver 22 controls the drive current so as to achieve a desired value by means of an auto power control circuit (APC) 24.

When data are recorded on the optical disk 10, data which are to be recorded and transmitted from a host are supplied to an encoder/decoder circuit 36 by way of an interface I/F 40. The encoder/decoder circuit 36 stores the data to be recorded in buffer memory 38, encodes the data to be recorded into modulated data, and supplies the modulated data to a write strategy circuit 42. In addition to an 8-16 modulation scheme for a DVD, an 8-12 modulation scheme can be used as the modulation scheme. In the present embodiment, by way of an example, the data are modulated by the 8-12 modulation scheme. Two types of modulated data (a substituted conversion table) having different DSV values are prepared for data which are not yet modulated and fall within a certain range (e.g., 0 to 87), and a single modulated data set may be prepared for subsequent data. The write strategy circuit 42 converts the modulated data into a multi pulse (pulse train) in accordance with a predetermined recording strategy and supplies the converted data as record data to the driver 22. The record strategy is formed from, e.g., a pulse width of a leading pulse in a multi pulse train, a pulse width of a subsequent pulse, and a pulse duty. The laser beam whose power has been modulated by the record data is emitted from the LD of the optical pickup 16, whereby the data are recorded on the optical disk 10. After recording of the data, the optical pickup 16 reproduces the record data by radiating a laser beam of reproducing power to thus reproduce the record data and supplies the reproduced data to the RF circuit 26. The RF circuit 26 supplies a reproduction signal to the binarizing circuit 34, and binarized modulated data are supplied to the encoding/decoding circuit 36. The encoding/decoding circuit 36 decodes the modulated data and verifies the decoded data against the data recorded in the buffer memory 38. The result of verification is supplied to the system controller 32. The system controller 32 determines whether to continue recording of data or perform switching operation, on the basis of the result of verification.

When data are recorded, the system controller 32 performs OPC and ROPC in the same manner as in the prior art. Specifically, the system controller 32 supplies test data to the encoding/decoding circuit 36 before recording and records the test data in a test area of the optical disk 10 by changing the recording power in a plurality of steps. The recorded test data are reproduced by means of the reproducing power, and optimum recording power is selected on the basis of a β value of a reproduced RF signal. The thus-selected power is taken as recording power. Moreover, the system controller 32 cyclically detects the quantity of return light arising during recording of the data and determines whether or not the level of return light (i.e., a level B) coincides with a predetermined value stored in memory be fore hand. When no coincidence exists, the recording power is increasingly or decreasingly adjusted in accordance with the magnitude of a difference. Specifically, when the quantity of return light is a predetermined value or less, the recording power is determined to be excessive, and the recording power is decreased. Alternatively, the optimum recording power Po selected through OPC and the value Bo of the level B of the quantity of return light arising when the test data are recorded by the recording power Po are stored in memory. The recording power is adjusted through use of these values and the level B value detected during recording of data such that $Bo/Po^n = B/P^n = $ constant (where "n" is a positive rational number). ROPC of the present embodiment is performed at the time of formation of the longest pit length included in the synchronization information, and ROPC is performed when synchronization information about the "mark" of 13T is formed. Therefore, the encoding/decoding circuit 36 performs setting such that the polarities of the synchronization information about 13T alternately become a "mark" and a "space," and records the polarities in the optical disk 10. Specifically, the "mark" and the "space" are alternately set by means of changing the value of a specific control bit of synchronization information to 0 and 1 one after another.

When the data recorded in the optical disk 10 are reproduced, the laser beam of reproducing power is emitted from the LD of the optical pickup 16, and reflected light is converted into an electric signal by the PD. The thus-converted electrical signal is output. A reproduction signal output from the optical pickup 16 is supplied to the RF circuit 26. The RF circuit 26 generates a focus error signal and a tracking error signal from the reproduction signal and supplies the signals to the servo processor 30. On the basis of the error signals, the servo processor 30 servo-controls the optical pickup 16, thereby maintaining the optical pickup 16 in an on-focus state and a non-track state. The RF circuit 26 supplies an address signal included in the reproduction signal to an address decoding circuit 28. The address decoding circuit 28 demodulates address data pertaining to the optical disk from the address signal and supplies the thus-demodulated data to the servo processor 30 and the system controller 32.

The RF circuit 26 supplies a reproduced RF signal to a binarizing circuit 34. The binarizing circuit 34 binarizes the reproduced signal and supplies the resultant modulated signal to the encoding/decoding circuit 36. The encoding/decoding circuit 36 extracts a synchronization signal from the binarized signal, demodulates a data portion of the signal, and subjects the demodulated data portion to error correction, thereby producing reproduced data. The reproduced data are output to the host, such as a personal computer, by way of an interface I/F 40. When the reproduced data are output to the host, the encoding/decoding circuit 36 temporarily stores the reproduced data in buffer memory 38 and outputs the thus-stored data.

In the foregoing configuration, when the encoding/decoding circuit 36 extracts a synchronization signal, there is utilized a rule of the synchronization signal of the optical disk 10 being formed alternately as a mark, a space, a mark, a space, . . . . Specifically, what first appears (i.e., the first synchronization frame) is a synchronization signal for a mark. Hence, the encoding/decoding circuit 36 ascertains whether or not the detected synchronization signal of 13T is a mark signal. When the synchronization signal is the mark signal, the signal is reliably determined to be the synchronization signal of 13T. Similarly, what appears second (the second synchronization frame) is a synchronization signal for a space. Hence, the encoding/decoding circuit 36 ascertains whether or not the detected synchronization signal of 13T is a space signal. When the synchronization signal is the space signal, the space signal is reliably determined to be the synchronization signal of 13T.

The synchronization signal of the embodiment will be described hereinbelow.

Figures 2, 3:
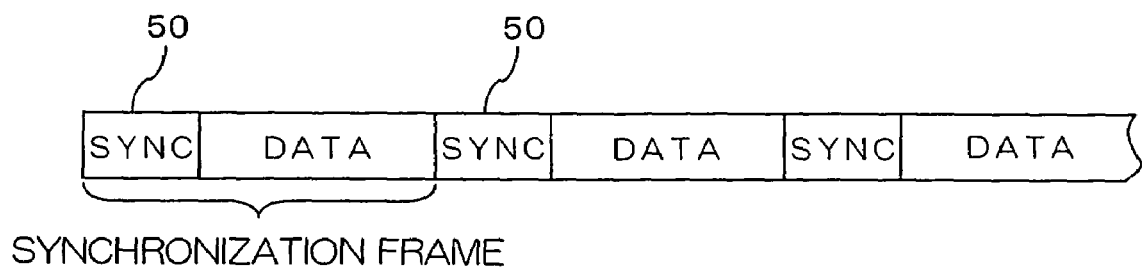
FIG. 2 is a descriptive view of a data format.
FIG. 3 is a descriptive view of a synchronization signal.

FIG. 2 shows the configuration of a physical sector of the optical disk 10. Respective physical sectors of the optical disk 10 are formed from 26 synchronization frames, and one synchronization signal (SY or SYNC) 50 is formed at the top of each synchronization frame. A plurality of types of synchronization signals (SY) 50; e.g., four types of synchronization signals SY0 to SY3, are prepared for identifying the synchronization frames, and the respective synchronization signals 50 are formed from 24 bits. The 8-12 modulated data are recorded in the data portion according to an NRZI (Non-Return to Zero Invert) scheme. The NRZI is a scheme for inverting an immediately-preceding value at a modulation code bit value 1 and maintaining an immediately-preceding value at a modulated code bit value 0. The modulated data are recorded in data lengths of 3T to 11T or 2T to 11T.

FIG. 3 shows an example of four types of synchronization signals SY0 to SY3 for identifying the synchronization frame. Here, two types of data; that is, a state 0 and a state 1, are prepared for the respective synchronization signals SY0 to SY3. Any one is selected from the four types in accordance with an immediately-preceding code data value (a code of 8 bit unit converted by the 8-12 scheme). In the drawings, the synchronization signal of state 0 is illustrated as one example.

In the drawings, the synchronization signal of SY0 is described as, e.g., 1000#0 010000 000000 001001, and "#" acts as a control bit. 1000#0 0 of the first seven bits are variable portions including control bits. 10000 000000 001001 subsequent to the variable portion is a fixed portion whose data value is fixed. Moreover, the synchronization signal of SY1 is described as, e.g., 10100#0 010000 000000 001001, and "#" similarly acts as a control bit. Any one value of 0 and 1 is set as a bit value for the control bit "#," and the polarity (mark/space) of the synchronization signal is determined in conjunction with the NRZI scheme. When #=1, the synchronization signal is referred to as a primary synchronization signal. When #=0, the synchronization signal is referred to as a secondary synchronization signal. The configuration for preparing a primary synchronization signal and a secondary synchronization signal as synchronization signals is known in the field of, e.g., a DVD. A general relationship between the primary synchronization signal and the secondary synchronization signal is that the secondary synchronization signal becomes a "space" when the primary synchronization signal becomes a "mark" and that the secondary synchronization signal becomes a "mark" when the primary synchronization signal becomes a "space." The primary synchronization signal and the secondary synchronization signal in the DVD are described in, e.g., JP-A-2001-266348.

Figure 4:
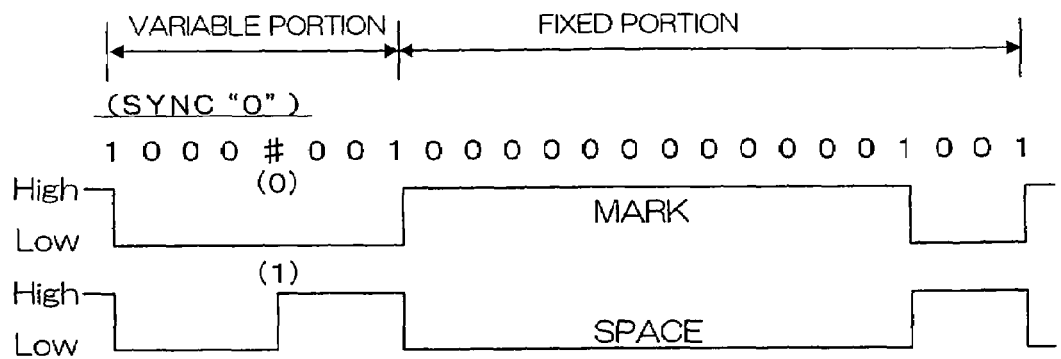
FIG. 4 is a descriptive view showing a relationship between a control bit value of SYNC0 and polarities.
Figure 5:
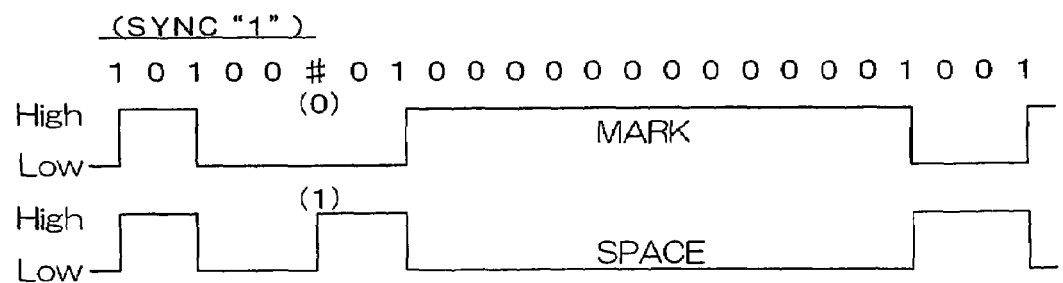
FIG. 5 is a descriptive view showing a relationship between a control bit value of SYNC1 and polarities.

FIGS. 4 and 5 show a relationship between the bit value of the control bit "#" and a polarity. FIG. 4 shows a relationship between a control bit and a polarity at SY0. When the value of the control bit "#" assumes 0 (secondary), the control bit remains in 0 (Low) for maintaining an immediately-preceding value 0 (Low). At the next 1 (the first 1 for specifying a fixed portion), the immediately-preceding value 0 (Low) is inverted to 1 (High). The synchronization signal of 13T is recorded as 1 (High); that is, a "mark." As has already been mentioned, a pit to be exposed to the laser beam of recording power is formed in the area of the "mark." Since the immediately-preceding value 1 (High) is again inverted at the next 1, the bit turns into 0 (Low). Further, 0 (Low) is inverted at a least significant bit 1 of the synchronization signal, whereupon the bit turns into 1 (High).

A modulated data section follows the synchronization signal. The polarity is inverted at a bit value 1 of the modulated data, and the polarity is then maintained in its present form at 0, whereby data are recorded.

In the meantime, when the value of the control bit "#" is 1 (primary), the preceding bit value 0 (Low) is inverted, and hence the bit assumes 1 (High). The preceding value 1 (High) is again inverted to 0 (Low) at the next 1 (the first 1 for specifying the fixed portion), and the synchronization signal of 13T is recorded as 0 (Low) or a "space." Since the immediately-preceding value 0 (Low) is again inverted at the next 1, the bit turns into 1 (High). Moreover, 1 (High) is inverted at the least significant bit 1 of the synchronization signal to turn into 0 (Low).

FIG. 5 shows a relationship between a control bit and a polarity at SY0. As in the case of SY1, the polarity is determined on the basis of whether the bit value of "#" is 0 or 1. Since the number of 1s changes between when the bit is 0 and when the bit is 1. Hence, the bit value of the control bit "#" changes a DSV value as well as a polarity, there by enabling control of the DSV value.

As mentioned above, the synchronization signal can be alternately set to a mark, a space, a mark, a space, . . . by means of setting the control bit. When the synchronization signal is reproduced and extracted from the optical disk 10 on which the synchronization signal is formed in compliance with the rule, the signal is extracted by reversely utilizing the rule. As mentioned previously, the mark and the space are alternately formed. Hence, when the previous synchronization signal is a mark, the current synchronization signal is expected to be a space. Therefore, the encoding/decoding circuit 36 verifies whether or not the detected synchronization signal of 13T is a space synchronization signal. If the detected synchronization signal is the space synchronization signal, the detected synchronization signal can be determined to be an accurate signal. A determination can be made as to whether or not the synchronization signal is a mark or a space, by means of determining whether a binarized signal output from the binarizer 34 is 1 or 0. Verification of the synchronization signal may be carried out not by the encoding/decoding circuit 36 but by the system controller 32. Specifically, the encoding/decoding circuit 36 detects the synchronization signal, detects the polarity of the thus-detected synchronization signal (i.e., whether the synchronization signal is a mark or a space), and then supplies the detected polarity to the system controller 32. The system controller 32 determines whether or not the current synchronization signal, thereby determining whether or not the polarity complies with the alternate rule.

The synchronization signals are arranged alternately such that a mark comes first and is followed by a space and a mark. Consequently, the mark synchronization signal appears in odd number synchronization frames, and the space synchronization signal appears in even number synchronization frames. This sequence can also be utilized for determining the sequential position of a detected synchronization signal. SY0 to SY3 are arranged in a predetermined sequence, and the sequential position of the synchronization signal can be detected by means of sequentially counting the synchronization signals. For instance, when the synchronization signal detected in the sixth sequential position is a space, the detected signal can be verified as a true sixth synchronization signal. Conversely, when the synchronization signal detected in the sixth sequential position is a mark, occurrence of an error of some type can be determined. Put another way, when the space synchronization signal is detected and the frame from which the synchronization signal has been detected is given an even number, the detected synchronization signal can be verified as a correct synchronization signal. As a matter of course, the synchronization signals can also be arranged such that a space comes first and is followed by a mark and a space. In this case, a space synchronization appears in an odd number synchronization frame, and a mark synchronization signal appears in an even number synchronization frame. This sequence can also be utilized for determining the sequential position of a detected synchronization signal. On the assumption that a frame starts from $0^{th}$, when synchronization signals are formed in sequence of a space, a mark, a space, . . . , a space synchronization signal appears in an even number synchronization frame, and a mark synchronization signal appears in an odd number synchronization frame.

The length of the mark synchronization signal and that of the space synchronization signal are detected, respectively, and characteristics of the reproduced signal are also preferably corrected in accordance with the length proportion of the mark synchronization signal to the space synchronization signal. In the embodiment, the synchronization signals are produced to a data length 13T. However, the synchronization signals are not necessarily formed accurately to a data length 13T because of fluctuations of recording power, variations in sensitivity characteristic of the film, or the like, so that the lengths of the synchronization signals are slightly increased or reduced. Consequently, for instance, when the mark synchronization signal is longer than the space synchronization signal (originally the length of the mark : the length of the space=1:1, however the proportion of lengths is changed to, e.g., the length of the mark: the length of the space=1.2:1, or the like) the reference clock signal used for detecting a mark synchronization signal can also be made longer than the reference clock signal used for detecting space synchronization signal. Specifically, a reference clock signal for a mark and a reference clock signal for a space are generated, and the synchronization signal is detected at the time of the mark synchronization signal through use of the reference lock signal for a mark, and the synchronization signal is detected at the time of the space synchronization signal through use of the reference signal for a space. Since the reference clock signals are generated by supplying a reproduced signal to a PLL, a PLL for a mark and a PLL for a space may be prepared. The two PLLs may be alternately used in a switching manner. As a result, erroneous detection of the synchronization signals can be prevented.

Alternatively, when the mark is longer than the space, there is a possibility of recording power required at the time of recording of a synchronization signal being excessive. Hence, adjustment of a reproduction gain (i.e., a reduction of reproduction gain), or the like, is also desirable.

When a window gate is used for detecting a synchronization signal, changing the timing or length of or the amount of delay in window gate signal between the case of a mark and the case of a space is also preferable. A technique for detecting a synchronization signal using the window gate signal is known and described in, e.g., JP-A-Hei-2-3-6472. Briefly speaking, when the synchronization signal is detected, the window gate signal is brought into H at a timing at which the next synchronization signal is assumed to be detected. The next synchronization signal is detected during a period in which the window gate signal remains H. The length proportion of the mark to the space is detected, the period during which the window gate signal becomes H is changed in according with the proportion. For instance, when the mark is longer than the space and when the next synchronization signal is a mark, the period during which the window gate signal is brought into H is made longer by a predetermined amount or a predetermined proportion. As a result, a rate at which the mark or space synchronization is detected can be improved. A circuit for generating a window gate can be formed from a counter for effecting counting to a predetermined value by taking, e.g., detection of a synchronization signal, as a trigger; and a multi vibrator for generating a pulse of predetermined width by means of incrementing operation of the counter. A width for mark and a width for space are used as predetermined widths, and the widths may be switched alternately.

What is claimed is:

1. An optical disk apparatus for reproducing data from an optical disk having synchronization information only once every predetermined information unit, wherein said predetermined information unit is a frame, said synchronization information items being formed such that polarities are arranged alternately as a mark and a space, the apparatus comprising:
    means for radiating a laser beam on said optical disk;
    means for receiving a laser beam reflected from said optical disk and outputting said received laser beam as a reproduced signal;
    means for extracting said synchronization information from said reproduced signal; and
    means for verifying said extracted synchronization information through use of a rule for alternately arranging said mark and said space;
    wherein, when said synchronization information detected in said frame is a space, said verification means verifies correctness of said synchronization information extracted in the next frame by means of determining whether or not a synchronization information detected in said next flame is a mark, and if a mark is not detected in said next frame, a synchronization error is determined by said verification means, in accordance with said rule for alternately arranging said mark and said space.

2. The optical disk apparatus according to claim 1, wherein,
said synchronization information is formed such that a space appears in an even number frame and such that a mark appears in an odd number frame; and
when said extracted synchronization information is a space, said verification means verifies correctness of said synchronization information by means of determining whether or not said frame comprising said synchronization information is an even number frame; and
when said extracted synchronization information is a mark, said verification means verifies correctness of said synchronization information by means of determining whether or not said frame comprising said synchronization information is an odd number frame.

3. The optical disk apparatus according to claim 1, wherein,
said synchronization information is formed such that a mark appears in an even number frame and such that a space appears in an odd number frame; and
when said extracted synchronization information is a space, said verification means verifies correctness of said synchronization information by means of determining whether or not said frame comprising said synchronization information is an odd number frame; and
when said extracted synchronization information is a mark, said verification means verifies correctness of said synchronization information by means of determining whether or not said frame comprising said synchronization information is an even number frame.

4. An optical disk apparatus for reproducing data from an optical disk having synchronization information only once every predetermined information unit, said synchronization information items being formed such that polarities are arranged alternately as a mark and a space, the apparatus comprising:
means for radiating a laser beam on said optical disk;
means for receiving a laser beam reflected from said optical disk and outputting said received laser beam as a reproduced signal;
means for extracting said synchronization information from said reproduced signal; and
means which compares the length of extracted mark synchronization information with the length of extracted space synchronization information, to thus reproduce data by means of changing a reproduction characteristic in accordance with the result of comparison.

5. An optical disk apparatus for reproducing data from an optical disk having synchronization information only once every predetermined information unit, said synchronization information items being formed such that polarities are arranged alternately as a mark and a space, the apparatus comprising:
means for radiating a laser beam on said optical disk;
means for receiving a laser beam reflected from said optical disk and outputting said received laser beam as a reproduced signal;
means for extracting said synchronization information from said reproduced signal; and
means which compares the length of extracted mark synchronization information with the length of extracted space synchronization information, to thus reproduce data by means of changing a reproduction characteristic in accordance with the result of comparison;
wherein said means that reproduces said data makes a reproduction gain small when said mark synchronization information is longer than said space synchronization information.

6. An optical disk apparatus for reproducing data from an optical disk having synchronization information only once every predetermined information unit, said synchronization information items being formed such that polarities are arranged alternately as a mark and a space, the apparatus comprising:
means for radiating a laser beam on said optical disk;
means for receiving a laser beam reflected from said optical disk and outputting said received laser beam as a reproduced signal;
means for extracting said synchronization information from said reproduced signal; and
means which compares the length of extracted mark synchronization information with the length of extracted space synchronization information, to thus reproduce data by means of changing a reproduction characteristic in accordance with the result of comparison;
wherein said means that reproduces said data makes a cycle of a reference clock signal to be used for detecting a mark synchronization signal longer than a cycle of a reference clock signal to be used for detecting a space synchronization signal when said mark synchronization information is longer than said space synchronization information.

7. The optical disk apparatus according to claim 4, further comprising:
means for verifying said extracted synchronization information through use of a rule for alternately arranging said mark and said space.

8. The optical disk apparatus according to claim 7, wherein,
said predetermined information unit is a frame;
said synchronization information is formed such that a space appears in an even number frame and such that a mark appears in an odd number frame; and
when said extracted synchronization information is a space, said verification means verifies correctness of said synchronization information by means of determining whether or not said frame comprising said synchronization information is an even number frame; and
when said extracted synchronization information is a mark, said verification means verifies correctness of said synchronization information by means of determining whether or not said frame comprising said synchronization information is an odd number frame.

9. The optical disk apparatus according to claim 7, wherein,
said predetermined information unit is a frame;
said synchronization information is formed such that a mark appears in an even number frame and such that a space appears in an odd number frame; and
when said extracted synchronization information is a space, said verification means verifies correctness of said synchronization information by means of determining whether or not said frame comprising said synchronization information is an odd number frame; and
when said extracted synchronization information is a mark, said verification means verifies correctness of said synchronization information by means of determining whether or not said frame comprising said synchronization information is an even number frame.

* * * * *

UNITED STATES PATENT AND TRADEMARK OFFICE
CERTIFICATE OF CORRECTION

| | |
|---|---|
| PATENT NO. | : 7,397,750 B2 |
| APPLICATION NO. | : 10/982245 |
| DATED | : July 8, 2008 |
| INVENTOR(S) | : Akira Mashimo |

It is certified that error appears in the above-identified patent and that said Letters Patent is hereby corrected as shown below:

COLUMN     LINE

8     67     "flame" should read --frame--
(Claim 1, line 21)

Signed and Sealed this

Fourteenth Day of July, 2009

JOHN DOLL
*Acting Director of the United States Patent and Trademark Office*